United States Patent [19]

Ong et al.

[11] Patent Number: 5,034,296
[45] Date of Patent: Jul. 23, 1991

[54] PHOTOCONDUCTIVE IMAGING MEMBERS WITH FLUORENE POLYESTER HOLE TRANSPORTING LAYERS

[75] Inventors: Beng S. Ong; Giuseppa Baranyi, both of Mississauga; Lupu Alexandru, Toronto, all of Canada

[73] Assignee: Xerox Corporation, Stamford, Conn.

[21] Appl. No.: 332,655

[22] Filed: Apr. 3, 1989

[51] Int. Cl.$^5$ .............................................. G03G 5/047
[52] U.S. Cl. ...................................... 430/59; 430/126
[58] Field of Search ............................................ 430/59

[56] References Cited

U.S. PATENT DOCUMENTS

| | | | |
|---|---|---|---|
| 3,884,690 | 5/1975 | Radler, Jr. | 430/58 |
| 4,012,251 | 3/1977 | Turner | 430/58 |
| 4,226,967 | 10/1980 | Tazuke et al. | 528/74 |
| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,820,601 | 4/1989 | Ong et al. | 430/59 X |
| 4,853,308 | 8/1989 | Ong et al. | 430/59 |
| 4,937,165 | 6/1990 | Ong et al. | 430/59 |

FOREIGN PATENT DOCUMENTS 62-208054 9/1987 Japan ..................................... 430/59

Primary Examiner—Roland Martin
Attorney, Agent, or Firm—E. O. Palazzo

[57] ABSTRACT

A layered photoresponsive imaging member comprised of a photogenerating layer, and in contact therewith a hole transporting layer comprised of fluorene charge transport polyesters of the following formulas:

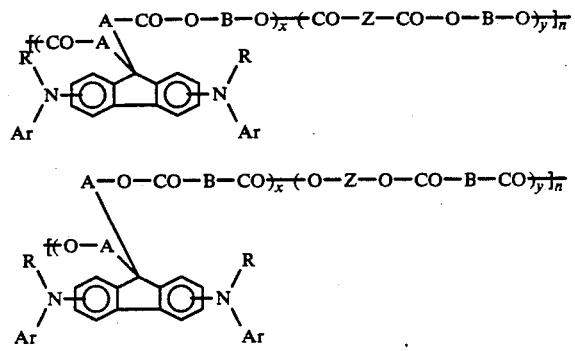

where A, B, Z are independently selected from a group of bifunctional groups; R is an alkyl or aryl group; Ar is an aryl or substituted aryl group; x and y are mole fractional numbers wherein x is greater than 0, and the sum of x and y is equal to 1.0; and n represents the number of repeating segments.

21 Claims, 1 Drawing Sheet

PHOTOCONDUCTIVE IMAGING MEMBERS WITH FLUORENE POLYESTER HOLE TRANSPORTING LAYERS

BACKGROUND OF THE INVENTION

This invention is generally directed to photoresponsive imaging members, and more specifically the present invention is directed to layered photoresponsive imaging members with a hole transporting layer comprised of fluorene-based hole transport polyesters. Thus, in one embodiment, the present invention relates to an imaging member comprised of a photogenerating layer, and a charge, or hole transport layer comprised of bis(alkylarylamino)fluorene or bis(diarylamino)fluorene hole transport polyester. Further, in another embodiment of the present invention there is provided an imaging member comprised of a supporting substrate, a hole transport layer comprised of bis(alkylarylamino)fluorene, or bis(diarylamino)fluorene polyesters of the formula illustrated herein, and a photogenerating layer. Additionally, the present invention includes within the scope thereof imaging members wherein the photogenerating layer is situated between the hole transporting layer, and the supporting substrate. The photoresponsive imaging members of the present invention are useful for incorporation into various imaging systems, particularly xerographic imaging processes wherein, for example, the members are initially charged negatively, and development is accomplished by dry or liquid developer compositions. Also, the aforementioned novel fluorene polyesters of the present invention are environmentally safe, nonhazardous and nontoxic; and their structural simplicities render their synthesis easily executable by known economic processes. Moreover, they are substantially resistant to liquid and dry developer compositions in that, for example, they are immune to crystallization, a disadvantage associated with many prior art hole transport compounds such as those illustrated in U.S. Pat. No. 4,265,990 when liquid developers are selected; and further, with the bis(diarylamino)fluorene polyesters of the present invention resinous binders can be avoided. Furthermore, the layered photoresponsive imaging members of the present invention are durable, possess acceptable dark decay characteristics, and are insensitive to changes in environmental conditions such as humidity and temperature. Furthermore, the charge transport polyesters of the present invention possess acceptable solubility in common organic solvents such as halogenated, especially chlorinated hydrocarbons, tetrahydrofuran, toluene, xylene, and the like, thus enabling improved coatability thereof by various processes such as spray, web, dip, and draw-down coating techniques.

The generation and development of electrostatic latent images on the surfaces of photoconductive members by electrostatic means is well known. One electrostatic method involves the formation of a latent image on the surface of a photoreceptor. These photoreceptors can be comprised of a conductive substrate containing on its surface a layer of photoconductive insulating material, and in many instances there can be incorporated therein a thin charge blocking layer between the substrate and the photoconductive layer to prevent charge injection into the photoconductive layer upon charging of its surface, which injection would adversely effect the quality of the resulting image.

Numerous different xerographic photoconductive members are known including, for example, a homogeneous layer of a single material such as vitreous selenium, which can function as both a photogenerating and hole transporting substance, or composite layered devices with a photoconductive substance dispersed in other substances. An example of one type of composite photoconductive layer used in xerography is described, for example, in U.S. Pat. No. 3,121,006 wherein there is disclosed a number of layers comprising finely divided particles of a photoconductive inorganic compound dispersed in an electrically insulating organic resin binder.

As more advanced, higher speed electrophotographic copiers, duplicators and printers were developed, degradation of image quality was encountered during cycling. Moreover, complex, highly sophisticated duplicating and printing systems operating at high speeds have placed stringent requirements including narrow operating limits on photoreceptors. For example, the numberous layers found in many modern photoconductive imaging members must be highly flexible, adhere well to adjacent layers, and exhibit predictable electrical characteristics within narrow operating limits to provide excellent toner images over many thousands of cycles. There is also a great current need for long service life, flexible photoreceptors in compact imaging machines that employ small diameter support rollers for photoreceptor belt systems compressed into a very confined space. Small diameter support rollers are also highly desirable for simple, reliable copy paper stripping systems which utilize the beam strength of the copy paper to automatically remove copy paper sheets from the surface of a photoreceptor belt after toner image transfer. However, small diameter rollers, for example, less than about 0.75 inch (19 millimeters) diameter, raise the threshold of mechanical performance criteria for photoreceptors to such a high level that spontaneous photoreceptor belt material failure becomes a frequent event for flexible belt photoreceptors.

There are also known photoreceptor members comprised of other inorganic or organic materials wherein the charge carrier generation and charge carrier transport functions are accomplished by discrete contiguous layers. Additionally, photoreceptors are disclosed in the prior art which include an overcoating layer of an electrically insulating polymeric material, and in conjunction with this overcoated type photoreceptor there have been proposed a number of imaging methods.

Specifically, there have been disclosed layered photoresponsive imaging members comprised of photogenerating layers and aryl amine hole transport layers in U.S. Pat. No. 4,265,990, the disclosure of which is totally incorporated herein by reference. Examples of photogenerating layers disclosed in these patents include trigonal selenium and phthalocyanines, while examples of the active transport layer molecules that may be employed are comprised of the aryl amines illustrated therein. The imaging members of the present invention are similar to those described in the aforementioned patent with the primary exception that there are selected in place of the aryl amines the bis(alkylarylamino)fluorene or bis(diarylamino)fluorene polyesters illustrated herein, which charge transport polyesters possess the improved characteristics disclosed herein, including permitting the more rapid transport of holes, and substantially no crystallization with dry, or liquid developer compositions. Also, the bis(alkylarylamino)fluorene or bis(diarylamino)fluorene charge transport polyesters of the present invention can be selected for layered imaging members wherein a resinous binder is eliminated. Furthermore, the fluorene charge transport polyesters selected for the imaging members of the present invention can be readily prepared by simple synthetic processes.

Photoreceptors have been developed which comprise charge transfer complexes prepared with polymeric molecules. For example, charge transport complexes formed with polyvinyl carbazole are disclosed in U.S. Pat. Nos. 4,047,948; 4,346,158 and 4,388,392. Photoreceptors utilizing polyvinyl carbazole layers as compared with current photoreceptor requirements exhibit relatively poor xerographic performance in both electrical and mechanical properties. Polymeric arylamine molecules prepared from the condensation or di-secondary amine with a di-iodo aryl compound are disclosed in European Patent No. 34,425, published Aug. 26, 1981, issued May 16, 1984. Since these polymers are extremely brittle and form films which are very susceptible to physical damage, their use in a flexible belt configuration is precluded.

Other prior art includes Canadian Patent No. 1,171,431, corresponding to European Patent No. 34,425 published Aug. 26, 1981, issued May 16, 1984, discloses condensation polymers of a di-secondary amine with a di-iodo aryl compound are described, for example, in working Examples IX and X;

Stolka et al., Photoconductivity and Hole Transport in Polymers of Aromatic Amine-Containing Methacrylates, Journal of Polymer Science: Polymer Chemistry Edition, Vol. 21, 969 (1983), discloses hole transport with high molecular weight arylamine-substituted polymethacrylates. Synthesis of the monomers, their polymerization, and the general properties of these polymers are also discussed;

U.S. Pat. No. 4,052,205 to Stolka et al., issued Oct. 4, 1977, describes a photoconductive imaging member comprising various active polymers, such as poly-N-vinyl carbazole, in a transport layer, for example line 45, column 5, to line 27, column 6. Derivatives of the active polymers may be hydroxy substituted, for example, column 5, lines 62–65;

U.S. Pat. No. 4,265,990, issued May 5, 1981, describes transport layers comprising small molecule arylamines and a polycarbonate resin binder;

U.S. Pat. No. 4,415,641, issued Nov. 15, 1983, discloses an electrophotographic light-sensitive element comprising a carbazole derivative (see column 3, lines 1 to 14). $R_2$ can represent a hydroxy group;

U.S. Pat. No. 4,588,666, issued May 13, 1986, discloses a hole transporting molecule comprising alkoxy derivatives of tetra phenyl biphenyl diamine (see column 3, lines 33 to 66). $R_1$ and $R_2$ represent alkoxy groups which include methoxy. Resins such as polyvinyl carbazoles, polycarbonate resins, epoxy resins, polyvinyl butyrals, and polyhydroxyether resins may be used as a binder for the hole transporting molecule;

U.S. Pat. No. 4,047,948, issued Sept. 13, 1977, discloses a photoreceptor comprising layers which may contain polyvinyl carbazole. The use of small molecule arylamine activating compounds in transport layers is also disclosed. The preferred small molecule resin binder is a polycarbonate resin;

U.S. Pat. No. 4,346,158, issued Aug. 24, 1982, discloses a photoreceptor comprising layers which may contain polyvinyl carbazole. The use of small molecule arylamine activating compounds in transport layers is also disclosed. The preferred small molecule resin binder is a polycarbonate resin;

U.S. Pat. No. 4,388,392, issued June 14, 1987, discloses a photoreceptor comprising layers which may contain polyvinyl carbazole. The use of an electron-donating polycyclic aromatic hydrocarbon incorporated in an electron-withdrawing polymeric photoconductor in a charge transporting layer is also disclosed;

U.S. Pat. No. 4,273,846, issued June 16, 1981, discloses an imaging member comprising a polycarbonate resin material and an arylamine (see the general formula, column 2, lines 21 to 34). Poly-N-vinyl carbazole may be employed in the generator layer;

U.S. Pat. No. 3,844,781, issued Oct. 29, 1974, discloses various photoconductive materials containing substituents such as hydroxyl, amino and alkoxy groups;

U.S. Pat. No. 3,890,146, issued June 17, 1975, discloses various photoconductive materials containing substituents such as hydroxyl, amino and alkoxy groups; and U.S. Pat. No. 4,588,667, issued May 13, 1986, discloses various overcoated electrophotographic imaging members including a multilayered imaging member having a substrate, a titanium metal layer, a siloxane blocking layer, an adhesive layer, a charge generating binder layer, and a charge transport layer. The transport layer may contain from about 25 to about 75 percent by weight of arylamine transport material in a resin binder such as polycarbonate resin.

Other representative prior art disclosing layered photoresponsive devices include U.S. Pat. Nos. 4,115,116; 4,047,949; 4,081,274 and 4,315,981. According to the disclosure of the '981 patent, the recording member consists of an electroconductive support, a photoconductive layer of organic materials which contain a charge carrier producing dyestuff layer of a compound having an aromatic, or heterocyclic polynuclear quinone ring system, and a charge transport layer.

Furthermore, there are disclosed in U.S. Pat. No. 4,135,928 electrophotographic light sensitive members comprised of 7-nitro-2-aza-9-fluorenylidene-malononitrile as charge transporting substances. According to the disclosure of this patent, the electrophotographic light sensitive members are comprised of an electroconductive support, a layer thereover of a photogenerating substance, and 7-nitro-2-aza-9-fluorenylidene-malononitrile of the formula, for example, as illustrated in column 1. There are also disclosed in U.S. Pat. No. 4,474,865 imaging members with electron transporting layers of fluorenylidene derivatives. In addition, there are also known layered photoresponsive imaging members wherein there are selected hole transport layers of arylamines and various photogenerating squaraine compounds, reference for example U.S. Pat. Nos. 4,552,822; 4,415,639; 4,471,041; and 4,486,520.

There are also illustrated in U.S. Pat. No. 4,618,551, the disclosure of which is totally incorporated herein by reference, photoresponsive imaging members with photogenerating layers, and charge transport layers comprised of polysilylenes. More specifically, there is illustrated in the aforementioned patent a polysilylene hole transporting compound for use in imaging members, which compound is of the formula as illustrated in claim 1 with specific examples of polysilylenes being poly(methylphenylsilylene) of an average molecular weight of greater than 50,000.

Also of particular interest is U.S. Pat. No. 4,106,934, which illustrates photoconductive insulating compositions containing one or more p-type organic photoconductor components and a charge transfer complex of one or more electron acceptor components of the formulas as illustrated in the Abstract, for example. Particularly useful as Formula 1 type compounds are those materials as illustrated in column 5, beginning at line 30. Further, the use of N-substituted polymeric acrylic acid amides and alpha-alkyl acid amides as overcoatings for photoconductors is illustrated in U.S. Pat. No. 3,307,940 (see Formula 5, column 2). Moreover, fluorenylidene derivatives as charge transporting compounds in photoreceptors are disclosed in U.S. Pat. Nos. 4,440,455; 4,245,021; 4,415,640; 4,559,287 and 4,562,132. In addition, U.S. Pat. No. 3,615,412 discloses organic photoconductors with certain fluorenes fused to benzo and naphtho ring structures, reference columns 1 to 3.

Also, copending application U.S. Ser. No. 061,247, filed June 2, 1987, (now abandoned) illustrates imaging members with hydroxy fluorene derivatives. The following patent applications and U.S. patents are mentioned: (1) U.S. Pat. No. 4,818,650 discloses layered imaging members with novel polymeric, hydroxy and alkoxy aryl amines, wherein m is a number of between about 4 and 1,000, reference for example claims 1 and 2; (2) U.S. Ser. No. 061,247 (now abandoned) and U.S. Ser. No. 07/198,254, now U.S. Pat. No. 4,871,634, illustrate imaging members with novel dihydroxy terminated aryl amine small molecules, reference claims 1 and 2, for example; (3) U.S. Pat. No. 4,806,444, the disclosure of which is totally incorporated herein by reference, describes layered imaging members with novel polycarbonate polymeric aryl amines, reference claims 1 and 2, for example; (4) U.S. Pat. No. 4,806,443, the disclosure of which is totally incorporated herein by reference, illustrates novel polycarbonate polymeric amines useful in layered imaging members, reference claims 1 and 2, for example; and (5) U.S. Pat. No. 4,801,517, the disclosure of which is totally incorporated herein by reference, which discloses imaging members with novel polycarbonate aryl amines, reference claims 1 and 2, for example.

In U.S. Pat. Nos. 4,869,988, and 4,946,754 entitled, respectively, PHOTOCONDUCTIVE IMAGING MEMBERS WITH N,N-BIS(BIARYLYL)ANILINE, OR TRIS(BIARYLYL)AMINE CHARGE TRANSPORTING COMPONENTS, and PHOTOCONDUCTIVE IMAGING MEMBERS WITH BIARYLYL DIARYLAMINE CHARGE TRANSPORTING COMPONENTS, the disclosures of which are totally incorporated herein by reference, there are described layered photoconductive imaging members with transport layers incorporating biarylyl diarylamines, N,N-bis(biarylyl)anilines, and tris(biarylyl)amines as charge transport compounds. In the above-mentioned patents, there are disclosed improved layered photoconductive imaging members comprised of a supporting substrate, a photogenerating layer optionally dispersed in an inactive resinous binder, and in contact therewith a charge transport layer comprised of the above-mentioned charge transport compounds, or mixtures thereof dispersed in resinous binders; and disclosed in U.S. Pat. No. 4,853,308, the disclosure of which is totally incorporated herein by reference, is a layered photoresponsive imaging member comprised of a photogenerating layer, and in contact therewith a hole transporting layer comprised of fluorene derivatives of the following formula dispersed in an inactive resinous binder:

where R and R' are independently selected from the group consisting of hydrogen, alkyl, and substituted alkyl groups; and Ar and Ar' are independently selected from the group consisting of aryl and substituted aryl substituents.

The charge transport fluorene polyesters of the present invention differ from other known charge transport compounds in that the invention charge transport polymer systems are derived from either the bis(alkylarylamino)fluorene or bis(diarylamino)fluorene hole transport structure. More importantly, the charge transport moieties of the polymers of the present invention are covalently bonded to the backbones via the C-9 carbon atom of the fluorene structure, and are pendent to their polymer backbones. The transport moieties of these polyesters are accordingly forced into assuming an intimate face-to-face stereochemical relationship, resulting in optimum electronic interactions between these transport moieties. The close interactions as described herein promote and enhance the overall charge transport capability of the charge transport polymeric systems of the present invention. In contrast, the transport moieties of the copending applications form an integral part of their polymer backbones, thus drastically inhibiting these structures from close electronic interactions.

Although imaging members with various hole transporting substances, including aryl amines and polysilylenes, and the amines and anilines of U.S. Pat. Nos. 4,869,988 and 4,946,754 are suitable for intended purposes, there continues to be a need for the development of improved members, particularly layered members which are comprised of bis(diarylamino)fluorene polyester transport layers; and which members are inert to crystallization, and insensitive to the changes in environmental conditions. Moreover, there continues to be a need for specific layered imaging members which not only generate acceptable images, but which can be repeatedly used in a number of imaging cycles without deterioration thereof from the machine environment or surrounding conditions. Additionally, there continues to be a need for improved layered imaging members wherein the materials employed for the respective layers, particularly the hole transporting layer, are substantially inert to each other. Further, there continues to be a need for improved photoresponsive imaging members which can be prepared with a minimum number of processing steps, and wherein the layers are sufficiently adhered to one another to allow the continuous use of these members in repetitive imaging processes. There also is a need for new hole transporting substances with excellent charge transport mobilities. Likewise, there is a need for hole transporting layers with increased stability, for example, wherein there is essentially no bleeding and segregation or crystallization of the transport molecules after an extended number of imaging cycles. Furthermore, there is a need for hole transporting compounds useful in layered imaging members, which compounds are superior insulators in the dark compared to many other known hole transporting compounds, thus enabling charging of the resulting imaging member to higher fields while maintaining cyclic stability, and allowing improved developability, especially with liquid developer compositions. Additionally, there is a need for layered imaging members which are environmentally safe, and which members are inert to the users. Another need of the present invention resides in the provision of layered imaging members with improved electrical characteristics, and comprised of bis(alkylarylamino)fluorene or bis(diarylamino)fluorene hole transport polyesters, which members can be positively or negatively charged depending on the configuration of the member. Moreover, there continues to be a need for a synthetic process for the preparation of fluorene hole transporting compounds useful in the layered imaging members of the present invention. There is also a need for imaging members wherein there can be selected the bis(alkylarylamino)fluorene or bis(diarylamino)fluorene polyesters illustrated herein, which polymers can function as single-component transport layers.

The imaging members incorporating charge transport polyesters of the present invention are resistant to Isopar solvent. The latter is commonly employed in liquid developer inks which generally degrade the mechanical integrity and electrical properties of photoreceptors. More specifically, the organic carrier fluid of a liquid developer tends to leach out charge transport small molecules, such as the arylamine compounds typically used in the small molecule-in-binder charge transport layers. Representative of this class of materials are: N,N'-diphenyl-N,N'-bis(3-methylphenyl)-[1,1'-biphenyl]-4,4'-diamine; bis-(4-diethylamino-2-methylphenyl)-phenylmethane; 2,5-bis-(4'-dimethylaminophenyl)-1,3,4,-oxadiazole; 1-phenyl-3-(4'-diethylaminostyryl)-5-(4''-diethylaminophenyl)-pyrazoline; 1,1-bis-(4-(di-N,N'-p-methylphenyl)aminophenyl)-cyclohexane; 4-diethylaminobenzaldehyde-1,1-diphenylhydrazone; 1,1-diphenyl-2(p-N,N-diphenyl amino phenyl)ethylene; and N-ethylcarbazole-3-carboxaldehyde-1-methyl-1-phenylhydrazone. The leaching process results in crystallization of the charge transport small molecules, such as the aforementioned arylamine compounds, onto the photoreceptor surface and subsequent migration of arylamines into the liquid developer ink. In addition, the ink vehicle, typically a C10 to C14 branched hydrocarbon, induces the formation of cracks and crazes in the photoreceptor surface. These effects lead to copy defects and shortened photoreceptor life. The degradation of the photoreceptor manifests itself as increased background and other printing defects prior to complete physical photoreceptor failure. The leaching out of the charge transport small molecule also increases the susceptibility of the transport layer to solvent/stress cracking when the belt is parked over a belt support roller during periods of non-use. Some carrier fluids also promote phase separation of the charge transport small molecules, such as arylamine compounds and their aforementioned derivatives, in the transport layers, particularly when high concentrations of the arylamine compounds are present in the transport layer binder. Phase separation of charge transport small molecules also adversely alters the electrical and mechanical properties of a photoreceptor.

SUMMARY OF THE INVENTION

It is, therefore, an object of the present invention to provide an improved photoresponsive member with many of the advantages illustrated herein.

It is yet another object of the present invention to provide an improved photoresponsive imaging member with novel fluorene hole transporting polyesters.

A further specific object of the present invention is the provision of an improved photoresponsive imaging member containing a photogenerating layer, and in contact therewith a hole transporting layer of fluorene hole transport polyesters.

Another specific object of the present invention is the provision of an improved photoresponsive imaging member containing a photogenerating layer, and in contact therewith certain fluorene polyesters as the hole transporting layer.

Yet another object of the present invention resides in the provision of an improved overcoated photoresponsive imaging member with a photogenerating composition layer situated between the hole transport layer and a supporting substrate.

In another object of the present invention there are provided processes for affecting preparation of the hole transporting polyesters disclosed hereinafter.

In yet another object of the present invention there are provided imaging and printing methods, including xerographic processes, utilizing the improved photoresponsive imaging member of the present invention.

In still yet another object of the present invention there are provided hole transport layers comprised of fluorene hole transport polyesters doped with certain fluorene hole transport small molecules, or monomers such as 9,9-dimethyl-2,7-bis(diphenylamino)fluorene, 9,9-dipropyl-2,7-bis(phenyl-p-tolylamino)fluorene, 9,9-bis(2-cyanoethyl)-2,7-bis(phenyl-m-tolylamino)fluorene, 9,9-bis(3-hydoxypropyl)-2,7-bis(phenyl-m-tolylamino)fluorene, 9,9-bis[2-(methoxycarbonyl)ethyl]-2,7-bis(phenyl-m-tolylamino)fluorene,9,9-bis[2-(ethoxycarbonyl)ethyl]-2,7-bis-(phenyl-m-chlorophenylamino)fluorene, 9,9-diethyl-2,7-bis[bis(m-chlorophenyl)amino]fluorene, 9,9-dimethyl-2,5-bis(m-tolyl-m-chlorophenylamino)fluorene, 9,9-dibutyl-2,7-bis(diphenylamino)fluorene; 9,9-dibutyl-2,7-bis(di-m-tolylamino)fluorene, 9,9-bis(3-acetoxypropyl)-2,7-bis(-phenyl-m-tolylamino)fluorene, and the like, to enhance the transport efficiency of the layers.

Another object of the present invention resides in the provision of single-component transport layers comprised of bis(alkylarylamino)fluorene or bis(diarylamino)fluorene polyesters, and which layers are devoid of the problems of small molecule leaching and crystallization, thus ensuring long-term device stability.

A further object is to provide layered imaging members which are suitable for use with liquid developer inks.

Moreover, in another object of the present invention is the provision of novel hole transport polyesters which are environmentally safe and inert to the users thereof.

A further object of the present invention is to provide novel bis(diarylamino)fluorene hole transport polyester layers whose electrical performances are insensitive to changes in environmental conditions.

These and other objects of the present invention are accomplished by the provision of an improved photoresponsive imaging member comprising a photogenerating layer and a charge, or hole transporting layer in contact therewith. More specifically, the present invention in one embodiment is directed to a photoresponsive imaging member comprised of a photogenerating layer situated between a bis(alkylarylamino)fluorene or bis(diarylamino)fluorene polyester hole transporting layer, and a supporting substrate, which polyester transport layer can be optionally doped with suitable fluorene hole transport small molecules as aforementioned herein to enhance the imaging member's photosensitivity.

The structural compositions of the bis(alkylarylamino)fluorene and bis(diarylamino)fluorene hole transporting polyesters or random copolyesters selected for the present invention are represented by the following general Formulas I and II:

carbon atoms, and the aryl group can contain from about 6 to 24 carbon atoms.

Illustrative examples of alkylene groups include those containing from 1 to about 25 carbon atoms, and preferably from 1 to 10 carbon atoms, such as methylene, dimethylene, trimethylene, tetramethylene, 2,2-dimethyltrimethylene, pentamethylene, hexamethylene, heptamethylene, and the like. Examples of ether and polymer segments include those containing from about 2 to about 25 carbon atoms, such as $-CH_2OCH_2-$, $-CH_2CH_2OCH_2CH_2-$, $-CH_2CH_2OCH_2-CH_2CH_2CH_2OCH_2CH_2-$, $-(CH_2CH_2O)_2-$, $-(CH_2CH_2O)_3-$, $-CH_2CH_2CH(CH_3)OCH_2CH_2-$, and the like. Examples of alkyl groups are those of from 1 to about 25 carbon atoms, such as methyl, ethyl, propyl, isopropyl, butyl, isobutyl, pentyl, 2-methylpentyl, wherein A, B and Z are independently selected from the group of bifunctional linkages such as alkylene, arylene, substituted alkylene, substituted arylene, ether and polyether segments; R is an alkyl, aryl or substituted group; Ar is an aryl group; x and y represent the mole fractional numbers of the composition units, preferably subject to the provision that x is greater than 0 and that the sum of x and y is equal to 1.0; and n is the number of structural composition units of, for example, from 5 to about 1,000, and preferably from about 10 to about 300. The alkyl group can contain from about 1 to 25 hexyl, octyl, nonyl, decyl, and the like, with methyl, ethyl, propyl, and butyl being preferred. Aryl substituents include those of from 6 carbon atoms to about 24 carbon atoms, such as phenyl, tolyl, ethylphenyl, and naphthyl. The aryl groups can be substituted with alkoxy, hydroxy, halo, cyano, alkoxyalkyl, and the like.

Specific examples of charge transporting polyesters of the present invention, and suitable for incorporation into the imaging members disclosed herein include the polyesters and copolyesters represented by the following Formulas III through XIII, wherein n, x and y are as defined herein, and ph is phenyl:

III

IV

V

-continued

VI

VII

VIII

IX

X

XI

XII

XIII

The charge transporting polyesters of the present invention are not readily available but can be readily synthesized by melt transesterification, and by solution polycondensation processes. Thus, for example, the charge transport fluorene polyesters of Formula I can be prepared by the reaction of a stoichiometric quantity of a bis(alkylarylamino)-substituted or bis(diarylamino)-substituted 9,9-bis(alkoxycarbonylalkyl)fluorene with a diol such as 1,5-pentanediol, 1,6-hexanediol, 1,7-heptanediol, 1,8-octanediol, 1,9-nonanediol, diethylene glycol, triethylene glycol, and the like, in the presence of a suitable catalyst at 130° to 200° C. under reduced pressure. For the preparation of copolyester of Formula I, a stoichiometric quantity of an appropriate comonomer diester such as dimethyl glutarate, dimethyl adipate, dimethyl pimelate, dimethyl suberate, dimethyl sebacate, dimethyl terephthalate, dimethyl isophthalate, dimethyl β,β-dimethylglutarate, dimethyl α-chloro-β'-methyladipate, and the like, is also employed. The polyester of Formula II can be readily synthesized by the reaction of a stoichiometric quantity of a bis(alkylarylamino)-substituted or bis(diarylamino)-substituted bis(hydroxyalkyl)fluorene with a diacyl chloride such as glutaryl chloride, adipoyl chloride, pimeloyl chloride, azelaoyl chloride, sebacoyl chloride, and the like, in the presence of from a stoichiometric quantity to 10-fold excess of a base such as triethylamine, tripropylamine, diisopropylamine, and the like. A suitable solvent, such as methylene chloride, tetrahydrofuran, ethyl acetate, and the like, is employed as the reaction medium, which reaction is generally executed at a temperature from about 0° C. to about 40° C., preferably from about 15° C. to about 30° C. For the preparation of copolyester of Formula II, a stoichiometric quantity of a suitable comonomer diol such as 1,5-pentanediol, 1,6-hexanediol, 1,7-heptanediol, 1,8-octanediol, 1,9-nonanediol, 1,4-bis(2-hydroxyethoxy)-benzene, diethylene glycol, triethylene glycol, and the like, is also utilized.

The following two reaction schemes illustrate two process embodiments of the present invention:

The improved photoresponsive imaging members of the present invention can be obtained by a number of known methods, the process parameters and the order of the coating of the layers being dependent on the member desired. Thus, for example, the improved photoresponsive imaging members of the present invention can be prepared by providing a conductive substrate containing an optional charge blocking layer, and an optional adhesive layer; and applying thereto by solvent coating processes, laminating processes, or other methods, a photogenerating layer and the hole transporting layer. Further, the improved photoresponsive members of the present invention can be utilized in various imag-

SCHEME 1
PREPARATION OF FLUORENE CHARGE TRANSPORT POLYESTERS BY
MELT TRANSESTERIFICATION where A, B, Z, n, Ar, x and y are as defined herein; R' and R" are, for example, alkyl groups such as methyl, ethyl, propyl, and the like.

ing systems; and more importantly can function simultaneously in imaging and printing processes with visible light or infrared light; wherein the members are initially SCHEME 2
PREPARATION OF FLUORENE CHARGE TRANSPORT POLYESTERS BY
SOLUTION POLYCONDENSATION where A, B, Z, n, Ar, x and y are as defined herein.

charged positively or negatively; followed by imagewise exposure; development of the image with a developer composition, reference U.S. patents the disclosures of which are totally incorporated herein by reference, and comprised of toner particles and carrier particles; transferring the developed image to a suitable substrate, such as paper; and permanently affixing the image thereon. The imaging members of the present invention are also useful for generating colored images subsequent to development with color toner compositions.

BRIEF DESCRIPTION OF THE DRAWINGS

For a better understanding of the present invention and further features thereof, reference is made to the following detailed description of various preferred embodiments wherein.

DESCRIPTION OF THE PREFERRED EMBODIMENTS

Figure 1:
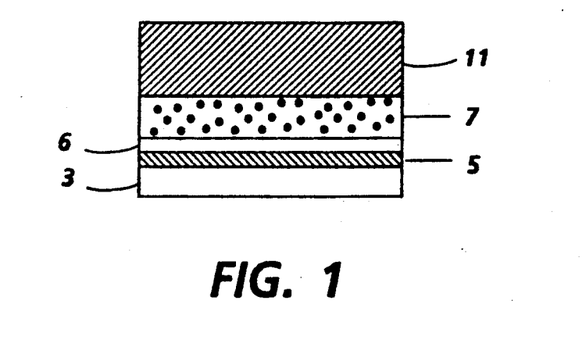
FIG. 1 is a partially schematic cross-sectional view of a photoconductive imaging member of the present invention.

Illustrated in FIG. 1 is the improved photoresponsive imaging member of the present invention comprising a substrate 3 of a thickness of 25 microns to 5,000 microns, an optional charge blocking layer 5 of a thickness of from about 2 Angstroms to about 500 Angstroms, an adhesive layer 6 of a thickness of from about 0.001 micron to about 1 micron, a charge carrier photogenerating layer 7 of a thickness of 0.05 micron to 10 microns, and a hole transporting layer 11 of a thickness of 5 microns to 60 microns comprised of the bis(alkylarylamino)fluorene or bis(diarylamino)fluorene charge transport polyesters illustrated herein.

Figure 2:
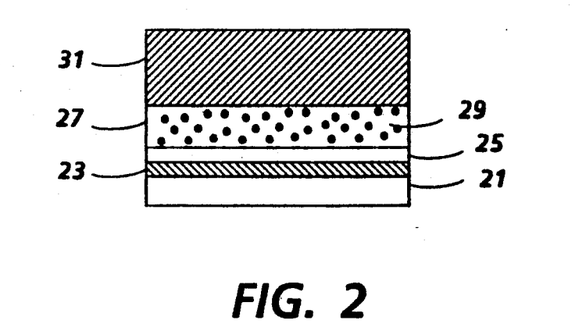
FIG. 2 is a partially schematic cross-sectional view of a second photoconductive imaging member of the present invention.

Illustrated in FIG. 2 is a second photoresponsive imaging member of the present invention comprising a supporting substrate 21 of a thickness of 25 microns to 5,000 microns, an optional charge blocking layer 23 of a thickness of from about a few Angstroms to about 500 Angstroms, an adhesive layer 25 of a thickness of from about 0.001 micron to about 1 micron, a charge carrier photogenerating layer 27 of a thickness of 0.05 micron to 10 microns, of trigonal selenium or vanadyl phthalocyanine optionally dispersed in an inactive resinous binder 29, and a charge or hole transporting layer 31 of a thickness of 5 microns to 60 microns comprised of the bis(alkylarylamino)fluorene or bis(diarylamino)fluorene charge transport polyesters of Formulas III through XIII.

Figure 3:
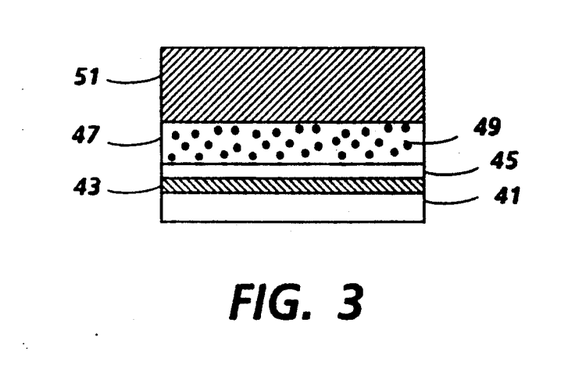
FIG. 3 illustrates a third photoresponsive imaging member of the present invention.

Illustrated in FIG. 3 is a preferred improved photoresponsive imaging member of the present invention comprising a substrate 41 of a thickness of 25 microns to 5,000 microns, a charge blocking layer 43 of a thickness of from about a few Angstroms to about 500 Angstroms, an adhesive layer 45 of a thickness of from about 0.001 micron to about 1 micron, a charge carrier photogenerating layer 47 of a thickness of 0.05 micron to 10 microns, of trigonal selenium, selenium alloys or vanadyl phthalocyanine, optionally dispersed in an inactive resinous binder 49, and a hole transporting layer 51 of a thickness of 5 microns to 60 microns comprised of bis(alkylarylamino)fluorene or bis(diarylamino)fluorene charge transport polyesters of Formulas II through XIII.

The supporting substrate layers may be opaque or transparent and may comprise any suitable material having the requisite mechanical properties. Therefore, the substrate may be comprised of a layer of nonconducting material such as an inorganic or organic polymeric material with a conductive surface layer arranged thereon, or a conductive material inclusive of, for example, a metallized organic polymeric material, aluminum, chromium, nickel, indium, tin oxide, and brass. Also, the substrate may be flexible or rigid, and may have many different configurations such as, for example, a plate, a cylindrical drum, a scroll, a seamless belt, or an endless belt.

The thickness of the substrate layer depends on many factors, including economical considerations, thus this layer may be of substantial thickness, for example, over 100 mils or of minimum thickness providing the objectives of the present invention are accomplished. In one preferred embodiment, the thickness of the supporting substrate is from about 25 microns to about 5,000 microns.

As optional charge blocking layers, usually in contact with the supporting substrate, there can be selected various suitable known materials including aluminum oxide, polysilanes, siloxanes, reference U.S. Pat. No. 4,464,450, the disclosure of which is totally incorporated herein by reference and the like. The primary purpose of this layer is to provide charge blocking, that is to prevent charge injection from the substrate during and after charging. Generally, this layer has a thickness of less than 50 Angstroms. The adhesive layer is usually situated either between the charge blocking layer and the photogenerating layer or between the photogenerating layer and the charge transport layer. The adhesive layer is typically of a polymeric material, including polyesters such as DuPont 49,000 polyester, and the like. Generally, this layer has a thickness of about 0.1 micron.

Photogenerating layers can include therein known photoconductive charge carrier generating materials, such as amorphous selenium, selenium alloys, halogen doped amorphous selenium, halogen doped amorphous selenium alloys, trigonal selenium, selenite and carbonates with trigonal selenium, reference U.S. Pat. Nos. 4,232,102 and 4,233,283, the disclosures of which are totally incorporated herein by reference, copper and chlorine doped cadmium sulfide, cadmium selenide, and cadmium sulfur selenide, and the like. Alloys of selenium include selenium tellurium alloys, selenium arsenic alloys, and preferably such alloys containing a halogen, such as chlorine, in an amount of from about 50 to 200 parts per million. Other photogenerating layer pigments include metal phthalocyanines, metal free phthalocyanines, vanadyl phthalocyanines, other known phthalocyanines, reference U.S. Pat. No. 3,816,118, the disclosure of which is totally incorporated herein by reference, squarylium pigments, charge transfer complex materials, and various sensitizers such as cyanine dyes, and the like; specifically inclusive of various phthalocyanine pigment such as the X-form of metal free phthalocyanine described in U.S. Pat. No. 3,357,989, metal phthalocyanines such as vanadyl phthalocyanine and copper phthalocyanine, quinacridones available from DuPont under the tradename Monastral Red, Monastral Violet and Monastral Red Y, Vat orange 1 and Vat orange 3 tradenames for dibromoanthanthrone pigments, benzimidazole perylene, substituted 2,4-diaminotriazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Selenium, selenium alloy, benzimidazole perylene, and the like, and mixtures thereof may be formed as a continuous, homogeneous photogenerating layer. Benzimidazole perylene compositions are well known and described, for example, in U.S. Pat. No. 4,587,189, the entire disclosure thereof being incorporated herein by reference. Multiphotogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference.

Typically, the photogenerating layer has a thickness of from about 0.05 micron to about 10 microns or more, and preferably is of a thickness of from about 0.2 micron to about 3 microns. Generally, however, the thickness of the photogenerating layer is dependent on the photogenerating pigment loading, which may vary from about 5 percent by volume to about 100 percent by volume, and other factors inclusive of mechanical considerations, for example, and whether a flexible photoresponsive imaging member is desired. Illustrative examples of polymeric binder resinous materials that can be selected for the photogenerating layer pigments and that may be selected for the charge transport layer include those as disclosed, for example, in U.S. Pat. No. 3,121,006, the disclosure of which is totally incorporated herein by reference, polyesters, polycarbonate resins, polyvinyl carbazole, epoxy resins, phenoxy resins, and the like. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amide-imide), styrene-butadiene copolymers, vinylidenechloride-vinylchloride copolymers, vinylacetatevinylidenechloride copolymers, styrene-alkyd resins, and the like. These polymers may be block, random or alternating copolymers.

Although one of the advantages of the imaging members of the present invention is the optional elimination of a binder for the charge transporting layer, optional resinous binders can be selected if desired such as the binders indicated herein for the photogenerating layer. The charge transporting polyesters of the present invention, therefore, can if desired be dispersed in a resinous binder in an amount of from about 10 percent by weight to about 95 percent by weight, and preferably in an amount of from about 40 percent by weight to about 80 percent by weight. Illustrative specific examples of organic resinous material useful as a transport binder include polycarbonates, acrylate polymers, vinyl polymers, cellulose polymers, polyesters, polysiloxanes, polyamides, polyurethanes and epoxies, as well as block, random or alternating copolymers thereof. Preferred electrically inactive binder materials are polyester resins having a molecular weight of from about 20,000 to about 100,000 with a molecular weight in the range of from about 50,000 to about 100,000 being particularly preferred. Also, this layer can be of various suitable thicknesses, and generally is of from about 5 microns to about 60 microns.

Furthermore, the imaging members of the present invention are particularly useful in electrophotographic, especially xerographic, imaging methods wherein negatively charged latent images are formed on the imaging member, subsequently affecting development of the image formed with a toner composition comprised of resin particles, pigment particles, and charge enhancing additives such as distearyl dimethyl ammonium methyl sulfate, reference U.S. Pat. No. 4,560,635, the disclosure of which is totally incorporated herein by reference; thereafter transferring the image to a suitable substrate and permanently affixing the image thereto by, for example, heat. Specifically, for example, conventional positive or reversal development techniques may be employed to form a marking material image on the imaging surface of the electrophotographic imaging member of this invention. Thus, by applying a suitable electrical bias and selecting toner having the appropriate polarity of electrical charge, one may form a toner image in the negatively charged areas or discharged areas on the imaging surface of the electrophotographic member of the present invention. More specifically, for positive development, charged toner particles of one polarity are attracted to the oppositely charged electrostatic areas of the imaging surface and for reversal development, charged toner particles are attracted to the discharged areas of the imaging surface. Where the transport layer of this invention is sandwiched between a photogenerating layer and a conductive surface, a positive polarity charge is normally applied prior to imagewise exposure to activating electromagnetic radiation. Where the photogenerating layer layer of this invention is sandwiched between a transport layer and a conductive surface, a negative polarity charge is normally applied prior to imagewise exposure to activating electromagnetic radiation.

The electrophotographic imaging member of the present invention exhibits, for example, greater resistance to cracking, crazing, and are devoid of the problems of crystallization of the charge transporting compounds, undesirable phase separation of the charge transporting compounds, and elimination of leaching of the charge transporting compounds, during cycling. In addition, the layered imaging members of the present invention are also suitable for use with liquid developer inks. The use of hole transport polyesters of the present invention as a single-component transport layer also assure a long-term device stability.

The invention will now be described in detail with respect to specific preferred embodiments thereof, it being understood that these examples are intended to be illustrative only. Also, the invention is not intended to be limited to the materials, conditions, and process parameters recited therein. All parts and percentages are by weight unless otherwise indicated.

EXAMPLE I 2,7-Bis(phenyl-m-tolylamino)-9,9-bis[2-(methoxycarbonyl)ethyl]fluorene Monomer Five hundred and fifty (550) milliliters of concentrated sulfuric acid was added slowly to 700 milliliters of water in a 3-liter round-bottomed flask cooled with an ice bath, followed by stirring with a mechanical stirrer. To this aqueous acid solution was added in small portions 168 grams of 9,9-bis(2-cyanoethyl)fluorene. The resulting mixture was then heated under reflux for three hours. After reaction completion, the precipitated white solid product was filtered, washed several times with water, and recrystallized from isopropanol to yield 161 grams of pure 9,9-bis(2-carboxyethyl)fluorene.

Subsequently, 56 grams of 9,9-bis(2-carboxyethyl)fluorene as obtained above was added to a mixture of 46 grams of iodine and 41 grams of ammonium persulfate in a mixture of 11 milliliters of concentrated sulfuric acid, 50 milliliters of water, and 240 milliliters of acetic acid. The resulting mixture was stirred mechanically, and heated at 80° C. for 12 hours. Thereafter, the precipitated white solid product, 2,7-diiodo-9,9-bis(2-carboxyethyl)fluorene, was filtered from the hot reaction mixture, washed several times with water, and dried in vacuo at 65° C. overnight.

A mixture of the diacid as obtained above, and 600 milliliters of methanol was heated under reflux in the presence of 0.5 gram of concentrated sulfuric acid. After three hours, the reaction mixture was cooled to room temperature, and poured carefully into a swirling aqueous sodium bicarbonate solution. The precipitated diester was filtered, and washed three times with water. Recrystallization from a methanol and water mixture afforded 70 grams of pure, 99.5 percent, 2,7-diiodo-9,9-bis[2-(methoxycarbonyl)-ethyl]fluorene, melting point 106° to 107.5° C.

Elemental Analysis Calculated for $C_{21}H_{20}I_2O_4$: C, 42.74; H, 3.42; O, 10.84. Found: C, 42.98; H, 3.53; O, 10.59.

$^1$H NMR (CDCl$_3$), δ (ppm): 1.4(t, 4H); 2.3(t, 4H); 3.55(s, 6H); 7.4 to 8.0(m, 6H)

IR (KBr Pellet): 1,735 cm$^{-1}$

MS, m/e (relative intensity): 524(100); 470(50); 430(35); 398(37); 344(38); 304(14); 215(12); 189(15); 176(42).

A mixture of 17.0 grams of 2,7-diiodo-9,9-bis[2-(methoxycarbonyl)ethyl]fluorene as obtained above, 4.3 grams of copper bronze, 12.5 grams of potassium carbonate in 30 milliliters of Soltrol 220 was mechanically stirred and heated to 150° C. under a nitrogen atmosphere. Fifteen (15.0) grams of molten N-phenyl-m-toluidine was added dropwise at this temperature. After addition, the resulting mixture was heated at 210° C. under reflux for 24 hours. The hot reaction mixture was filtered, and the filter cake was washed several times with hot cyclohexane. The combined filtrate was evaporated under reduced pressure to provide a brown residue which was purified by column chromatography on silica gel to afford 15.2 grams of pure 9,9-bis[2-(methoxycarbonyl)ethyl]-2,7-bis(phenyl-m-tolylamino)fluorene, melting point 159° to 160° C.

Elemental Analysis Calculated for $C_{47}H_{44}N_2O_4$: C, 80.54; H, 6.33; O, 9.13. Found: C, 80.77; H, 6.65; O, 9.08.

$^1$H NMR (CDCl$_3$), δ (ppm): 1.7(t, 4H); 2.15(t, 4H); 2.25(s, 6H); 3.55(s, 6H); 6.8 to 7.5(m, 24H).

IR (KBr Pellet): 1,740 cm$^{-1}$

MS, m/e (relative intensity): 614(2); 540(38); 519(20); 485(4); 431(32); 372(10); 350(100); 270(50); 262(30); 231(11); 223(15); 216(12); 186(11); 167(21).

EXAMPLE II 2,7-Bis(phenyl-m-tolylamino)-9,9-bis(3-hydroxypropyl)fluorene Monomer To a well-stirred solution of 8.8 grams of 9,9-bis[2-(methoxycarbonyl)ethyl]-2,7-bis(phenyl-m-tolylamino)-fluorene as obtained in Example I in 150 milliliters of dried tetrahydrofuran under a nitrogen atmosphere was added in small portions 0.52 gram of lithium aluminum hydride over a period of 15 to 30 minutes. The reaction mixture was stirred at room temperature for two hours. Ten percent aqueous sodium hydroxide solution was slowly added to the reaction mixture. The organic layer was separated and evaporated to dryness under reduced pressure. The residue was dissolved in methylene chloride, and washed several times with water. Evaporation of the dry methylene chloride solution gave a white solid which was recrystallized from isopropanol and water to yield 7.8 grams of pure product, melting point 216° to 217° C.

Elemental Analysis Calculated for $C_{45}H_{44}N_2O_2$: C, 83.82; H, 6.88; O, 4.96. Found: C, 83.61; H, 6.93; O, 4.91.

$^1$H NMR (CD$_2$Cl$_2$), δ (ppm): 0.95(m, 4H); 1.3(br s, 2H); 1.85(m, 4H); 2.25(s, 6H); 3.3(t, 4H); 6.8 to 7.6(m, 24H).

IR (KBr Pellet): 3,390 cm$^{-1}$

MS, m/e (relative intensity): 644(88); 540(20); 403(27); 385(19); 372(3); 357(4); 322(100); 270(33); 254(2); 216(3); 182(12); 167(25).

EXAMPLE III

Synthesis of Charge Transport Polyester III

A mixture of 3.0 grams of 2,7-bis(phenyl-m-tolylamino)-9,9-bis(3-hyroxypropyl)fluorene as obtained in Example II and 1.05 grams of azelaoyl chloride was dissolved in 12 milliliters of dry methylene chloride in a 25 milliliter round-bottomed flask under an inert atmosphere. After 1.2 grams of triethylamine was added, the reaction mixture was stirred at room temperature for 8 hours. Subsequently, the mixture was treated with 1 milliliter of absolute ethanol for an hour before working up by first diluting with 50 milliliters of methylene chloride, and then by washing with water, followed by drying, and evaporated under reduced pressure to give a white residue. The latter was dissolved in 25 milliliters of methylene chloride, and the resultant polyester was precipitated from the solution by adding dropwise to 500 milliliters of swirling methanol. The solid precipitate was filtered, washed with methanol, and reprecipitated twice as indicated above to provide 3.2 grams of polyester III after drying in vacuo at 50° C. for 24 hours. The number average molecular weight of polyester III was 17,400 as determined by the GPC technique (relative to polystyrene standard).

H$^1$ MNR (CD$_2$Cl$_2$), δ (ppm): 0.9 to 2.4(m, 22H); 2.3(br s, 6H); 4.0(br, 4H); 6.8 to 7.6(m, 24H).

IR (thin film): 1,740 cm$^{-1}$

EXAMPLE IV

Synthesis of Charge Transport Polyester VIII

Three (3.0) grams of 2,7-bis(phenyl-m-tolylamino)-9,9-bis[2-(methoxy-carbonyl)ethyl]fluorene as obtained in Example I, 1.5 grams of 1,6-hexanediol and 0.01 gram of titanium isopropoxide were thoroughly mixed, and heated at about 150° C. with an oil bath for 30 minutes in a round-bottomed flask fitted with an adaptor for vacuum distillation. The adaptor was connected in series to a cold trap and a water aspirator. The pressure of the reaction vessel was gradually reduced to about 50 millimeters Hg, while the temperature of the oil bath was maintained at 150° C. After 30 minutes of reaction, the temperature of the oil bath was raised over a period of 1 hour to a final temperature of 195° C. During this period, the pressure of the reaction vessel was also gradually reduced to about less than 10 millimeters Hg. The polycondensation reaction was continued at this temperature and pressure for an additional 3 hours, during which time the excess of 1,6-hexanediol was distilled out and collected in the cold trap. The mixture was cooled to room temperature, and dissolved in 30 milliliters of tetrahydrofuran, and filtered. The filtrate was added dropwise to 500 milliliters of methanol and water (3:2 by volume) with stirring. The precipitated polyester VII was filtered, washed with methanol, and dried in vacuo at 50° C. overnight. The yield was 3.0 grams, and the number average molecular weight was 19,600 as determined by GPC (relative polystyrene standard by GPC).

$H^1$ MNR ($CD_2Cl_2$), δ (ppm): 1.0 to 2.4(m, 16H); 2.3(s, 6H); 3.9(br, 4H); 6.8 to 7.6(m, 24H).

IR (thin film): 1,735 $cm^{-1}$

EXAMPLE V

Synthesis of Charge Transport Copolyester XIII

The charge transport copolyester XIII was synthesized in accordance to the procedure of Example III except that a mixture of 1.5 grams of 2,7-bis(phenyl-m-tolylamino)-9,9-bis(3-hyroxypropyl)fluorene and 0.28 gram of 1,6-hexanediol was employed in place of 3.0 grams of 2,7-bis(phenyl-m-tolylamino)-9,9-bis(3-hyroxypropyl)fluorene. In addition, the product was precipitated from 500 milliliters of methanol and water (3:2 by volume) using 25 milliliters tetrahydrofuran solution of the crude copolyester product. The yield of copolyester XIII was 2.1 grams, and the number average molecular weight was 15,500 as determined by GPC (relative polystyrene standard by GPC).

$H^1$ MNR ($CD_2Cl_2$), δ (ppm): 0.9 to 2.4(m, 22H); 2.3(br, 3H); 4.0(br, 4H); 6.8 to 7.6(m, 12H).

IR (thin film): 1,740 $cm^{-1}$

EXAMPLE VI

A layered photoconductive imaging member comprised of bis(phenyl-m-tolylamino)fluorene charge transport polyester III as obtained in Example III, and a trigonal selenium photogenerator was prepared as follows:

A dispersion of trigonal selenium and poly(N-vinylcarbazole) was prepared by ball milling 1.6 grams of trigonal selenium and 1.6 grams of poly(N-vinylcarbazole) in 14 milliliters each of tetrahydrofuran and toluene. Ten grams of the resulting slurry was then diluted with a solution of 0.25 gram of 9,9-bis[2-(methoxycarbonyl)ethyl]-2,7-bis(phenyl-m-tolylamino)-fluorene in 5 milliliters each of tetrahydrofuran and toluene. A 1.5 microns thick photogenerator layer was fabricated by coating the above dispersion onto an aluminized Mylar substrate, thickness of 2 mils, with a multiple-clearance film applicator, followed by drying in a forced air oven at 135° C. for 5 minutes. A solution for the hole transport layer was then prepared by dissolving 1.5 grams of charge transport polyester III of Example II in 14 milliliters of methylene chloride. This solution was then coated over the photogenerator layer by means of a multiple-clearance film applicator. The resulting member was then dried in a forced air oven at 130° C. for 30 minutes resulting in a 17 microns thick transport layer.

The fabricated imaging member was then electrically tested by negatively charging it with a corona, and discharged by exposing to white light of wavelengths of from 400 to 700 nanometers. Charging was accomplished with a single wire corotron in which the wire was contained in a grounded aluminum channel and was strung between two insulating blocks. The acceptance potential of this imaging member after charging, and its residual potential after exposure were recorded. The procedure was repeated for different exposure energies supplied by a 75 watt Xenon arc lamp of incident radiation, and the exposure energy required to discharge the surface potential of the member to half of its original value was determined. This surface potential was measured using a wire loop probe contained in a shielded cylinder, and placed directly above the photoreceptor member surface. This loop was capacitively coupled to the photoreceptor surface so that the voltage of the wire loop corresponded to the surface potential. Also, the cylinder enclosing the wire loop was connected to the ground.

For this imaging member, the acceptance potential was 900 volts, the dark decay was 30 volts/second, and the residual potential was 40 volts. Further, the electrical properties of this photoreceptor member remained essentially unchanged for 1,000 cycles of repeated charging and discharging.

EXAMPLE VII

A layered photoconductive imaging member with a transport layer of bis(phenyl-m-tolylamino)fluorene charge transport polyester III of Example II and an amorphous selenium generator layer was fabricated as follows:

A 0.5 micron thick layer of amorphous selenium on a ball grained aluminum plate of a thickness of 7 mils was prepared by conventional vacuum deposition techniques. Vacuum deposition was accomplished at a vacuum of $10^{-6}$ Torr, while the substrate was maintained at about 50° C. A hole transport layer on top of the amorphous selenium layer was obtained by coating a solution of bis(phenyl-m-tolylamino)fluorene charge transport polyester III in methylene chloride using a multiple-clearance film applicator. This solution was prepared by dissolving 1.0 gram of polyester III in 10 milliliters of methylene chloride. Thereafter, the resulting device was dried in a forced air oven at 40° C. for 1 hour to form a 15 micron thick transport layer. Subsequently, the imaging member was cooled to room temperature, followed by electrical testing in accordance with the procedure of Example VI except that a 450 nanometer monochromatic light was used for irradiation. Specifically, this imaging member was negatively charged to 800 volts and discharged to a residual potential of 65 volts. The dark decay was 15 volts/second.

EXAMPLE VIII

A layered photoconductive imaging member comprised of a transport layer 2,7-bis(phenyl-m-tolylamino)fluorene polyester IV as obtained in Example IV and trigonal selenium as the photogenerator was fabricated as follows:

A 1 micron trigonal selenium photogenerator layer was prepared on an aluminized Mylar substrate in accordance with the procedure of Example VI. A solution for the transport layer was prepared by dissolving 2.0 grams of polyester IV in 20 milliliters of methylene chloride. Thereafter, the solution was coated on top of the photogenerator layer by means of a multiple-clearance film applicator. The resulting member was then dried in a forced air oven at 130° C. for 30 minutes resulting in a dry thickness for the transport layer of 20 microns. Electrical testing was carried out in accordance with the procedure of Example VI. For this imaging member, the acceptance potential was 1,000 volts, the dark decay was 20 volts/second, and the residual potential was 60 volts.

EXAMPLE IX

A layered photoresponsive device comprised of a transport layer of copolyester XIII of Example V doped with a transport small molecule, and amorphous selenium as the photogenerator, was fabricated as follows:

A 0.5 micron thick layer of amorphous selenium on a ball grained aluminum plate of a thickness of 5 mils was prepared in accordance with the procedure of Example VII. A hole transport layer on top of the amorphous selenium layer was obtained by coating a solution of 2.0 grams of copolyester XIII and 1.0 gram of 2,7-bis(phenyl-m-tolylamino)-9,9-bis[2-(methoxycarbonyl)ethyl]-fluorene, 15 milliliters of methylene chloride, using a multiple-clearance film applicator. Thereafter, the resulting device was dried in a forced air oven at 40° C. for 1 hour to form a 21 micron thick transport layer.

Electrical testing was affected by repeating the procedure of Example VII. For this imaging member, the acceptance potential was 850 volts, the dark decay was 35 volts/second, and the residual potential was 20 volts.

EXAMPLE X

A photoresponsive device comprised of a transport layer of polyester IV doped with a transport small molecule, and squarylium pigments as the photogenerator was prepared as follows:

A ball grained aluminum substrate was coated with a solution of 1 milliliter of 3-aminopropyltrimethoxysilane in 100 milliliters of ethanol. The coating was heated at 110° C. for 10 minutes resulting in the formation of a 0.1 micron thick polysilane layer. A dispersion of a photogenerator prepared by ball milling a mixture of 0.075 gram of bis(N,N'-dimethylaminophenyl)squaraine and 0.13 gram of Vitel PE-200 polyester (Goodyear) in 12 milliliters of methylene chloride for 24 hours was then coated on top of the polysilane layer. After drying the coating in a forced air oven at 135° C. for 6 minutes, a 0.5 micron thick squarylium photogenerating layer was obtained.

The transport layer was prepared in accordance with the procedure of Example IX except that polyester IV was employed in place of copolyester XIII. The resulting device was dried in a forced air oven at 135° C. for 30 minutes resulting in a 20 micron thick electron transport layer.

Electrical testing was affected in accordance with the procedure of Example VI. Specifically, the device was charged negatively to 1,000 volts, and discharged with 830 nanometer monochromatic light. For this imaging device, the dark decay was 35 volts/second, and the residual potential was 25 volts.

EXAMPLE XI

A photoconductive imaging device with a transport layer comprised of polyesters III and IV, and a trigonal selenium photogenerator was prepared as follows:

A 2 micron thick trigonal selenium photogenerator layer on an aluminized Mylar was prepared in accordance with the procedure of Example VI. A solution for the transport layer was then prepared by dissolving 1 gram each of polyester III and IV in 15 milliliters of methylene chloride. This solution was then coated over the photogenerator layer using a multiple-clearance applicator. The coating was dried in a forced air oven at 135° C. for 30 minutes affording a transport layer of a thickness of 15 microns.

Electrical testing was affected by repeating the procedure of Example VI, and substantially similar results were achieved.

Other modifications of the present invention may occur to those skilled in the art based upon a reading of the present disclosure and these modifications are intended to be included within the scope of the present invention.

What is claimed is:

1. A layered photoresponsive imaging member comprised of a photogenerating layer, and in contact therewith a hole transporting layer comprised of fluorene charge transport components of the following formulas:

where A, B, Z are independently selected from a group of bifunctional groups; R is an alkyl or aryl group; Ar is an aryl or substituted aryl group; x and y are mole fraction numbers wherein x is greater than 0, and the sum of x and y is equal to 1.0; and n represents the number of repeating segments.

2. An imaging member in accordance with claim 1 wherein the bifunctional groups are alkylene, arylene, substituted alkylene, ether or polyether.

3. An imaging member in accordance with claim 1 wherein R is an alkyl group of from 1 to about 20 carbon atoms.

4. An imaging member in accordance with claim 1 wherein R, or Ar is an aryl group of from 6 to about 24 carbon atoms.

5. An imaging member in accordance with claim 1 wherein A, B and Z are alkylene or substituted alkylene groups containing from about 1 to about 20 carbon atoms.

6. An imaging member in accordance with claim 1 wherein A, B and Z are arylene groups containing from about 6 to about 30 carbon atoms, or derivatives thereof.

7. An imaging member in accordance with claim 1 wherein A, B and Z are ether or polyether groups containing from about 2 to about 20 carbon atoms.

8. An imaging member in accordance with claim 1 wherein the aryl substituents are phenyl, tolyl, or anisyl.

9. An imaging member in accordance with claim 1 wherein the aryl substituents are fluorophenyl, chlorophenyl, bromophenyl, or iodophenyl.

10. An imaging member in accordance with claim 1 wherein the hole transport polyester is 2,7-bis(phenyl-m-tolylamino)fluorene polyester III; 2,7-bis(phenyl-m-anisylamino)fluorene polyester IV; 2,7-bis(phenyl-p-tolylamino)fluorene polyester V; 2,7-bis(m-toly-p-tolylamino)fluorene polyester VI; bis(phenyl-p-chlorophenylamino)fluorene polyester VII; 2,7-bis(phenyl-m-tolylamino)fluorene polyester VIII; bis(diphenylamino)fluorene polyester IX; bis(phenyl-m-bromophenylamino)fluorene polyester X; 2,7-bis(phenyl-p-bromophenylamino)fluorene copolyester XI; bis(diphenylamino)fluorene copolyester XII; or 2,7-bis(phenyl-m-tolylamino)fluorene copolyester XIII.

11. An imaging member in accordance with claim 1 wherein the photogenerating layer is selected from the group consisting of metal free phthalocyanines, metal phthalocyanines, vanadyl phthalocyanines, selenium, selenium alloys, trigonal selenium, squaraine, and perylene pigments.

12. An imaging member in accordance with claim 11 wherein the photogenerating component is dispersed in a resinous binder.

13. An imaging member in accordance with claim 12 wherein the resinous binder is a polyester, a polycarbonate, an epoxy resin, a polyamide, a polysiloxane, or a vinyl polymer.

14. An imaging member in accordance with claim 1 wherein the hole transport layer is doped with a suitable fluorene charge transport small molecule in an amount of from 1 percent to about 50 percent by weight.

15. An imaging member in accordance with claim 14 wherein the fluorene charge transport small molecule is a bis(alkylarylamino)fluorene, or bis(diarylamino)fluorene hole transport compound.

16. An imaging member in accordance with claim 1 containing a supporting substrate.

17. An imaging member in accordance with claim 16 wherein the supporting substrate is aluminum.

18. An imaging method which comprises generating by exposure to a suitable source an electrostatic latent image on the imaging member of claim 1, followed by developing this image, subsequently transferring the image to a suitable substrate, and optionally, permanently affixing the image thereto.

19. A method of imaging in accordance with claim 14 wherein the hole transporting compound for the imaging member is selected from the polyesters of Formulas III, IV, V, VI, VII, VIII, IX, X, XI, XII, or XIII, wherein Ph is phenyl; x and y are mole fractional numbers wherein x is greater than 0, and the sum of x and y is equal to 1.0; and n represents the number of repeating segments.

20. A printing method which comprises generating a latent electrostatic image on the member of claim 1 with laser scanning, followed by developing this image, subsequently transferring the image to a suitable substrate, and optionally, permanently affixing the image thereto.

21. An imaging member in accordance with claim 1 containing a charge blocking layer, and an adhesive layer.

* * * * *